United States Patent [19]

Kawai et al.

[11] 4,304,129
[45] Dec. 8, 1981

[54] GAS FLOW MEASURING APPARATUS

[75] Inventors: Hisasi Kawai, Toyohashi; Tsuneyuki Egami, Aichi; Tokio Kohama, Nishio; Hideki Obayashi, Okazaki, all of Japan

[73] Assignee: Nippon Soken, Inc., Nishio, Japan

[21] Appl. No.: 92,517

[22] Filed: Nov. 8, 1979

[30] Foreign Application Priority Data

Nov. 13, 1978 [JP] Japan ............................. 53-140185
Nov. 13, 1978 [JP] Japan ............................. 53-140187
Feb. 6, 1979 [JP] Japan ............................. 54-12475

[51] Int. Cl.³ ............................................. G01F 1/68
[52] U.S. Cl. ..................................... 73/204; 73/118
[58] Field of Search .................. 73/204, 118; 338/290, 338/315, 319, 320, 322

[56] References Cited

U.S. PATENT DOCUMENTS

| 1,254,374 | 1/1918 | Thomas | 73/204 |
| 1,260,498 | 3/1918 | Wilson . | |
| 1,915,747 | 6/1933 | Moore | 13/25 X |
| 3,705,253 | 12/1972 | Hicks | 13/25 X |
| 4,067,233 | 1/1978 | Obayashi et al. | 73/204 X |
| 4,088,825 | 5/1978 | Carr | 13/25 |

FOREIGN PATENT DOCUMENTS 2749575 10/1979 Fed. Rep. of Germany ........ 73/204

Primary Examiner—Jerry W. Myracle
Attorney, Agent, or Firm—Cushman, Darby & Cushman

[57] ABSTRACT

A flow measuring pipe includes therein an electric heater and a temperature dependent resistor positioned downstream of the electric heater. The lines of the electric heater are arranged in a direction to cross the lines of the temperature dependent resistor. If necessary, a flame arrester is further disposed downstream of the temperature dependent resistor.

8 Claims, 23 Drawing Figures

GAS FLOW MEASURING APPARATUS

CROSS-REFERENCE TO RELATED APPLICATION

This application is related to U.S. patent application Ser. No. 092,024 entitled "GAS FLOW MEASURING DEVICE" filed on Nov. 7, 1979, by Hisashi KAWAI, Tsuneyuki EGAMI, Tokio KOHAMA and Hideki OBAYASHI, assigned to the same assignee as that of this application.

BACKGROUND OF THE INVENTION

This invention relates to gas flow measuring apparatus, such as an apparatus for measuring the amount of air flow to an engine.

In the past, an apparatus has been proposed which comprises a flow measuring pipe positioned in the intake pipe of an engine and an electric heater and temperature dependent resistors which are disposed in the flow measuring pipe, whereby the flow rate of air (the gas to be measured) is measured from their output signals.

While this apparatus has the advantage of ensuring accurate flow measurement with a compact and simple construction, there is a disadvantage that due to lack of due regard to the stretching of the resistance wires forming the electric heater and the temperature dependent resistors, the elements are affected by a small variation in the heat distribution and this causes the measuring accuracy to vary in accordance with the flow rate of air.

SUMMARY OF THE INVENTION

With a view to overcoming the foregoing deficiencies in the prior art, it is an object of the invention to prevent the variations in measuring accuracy caused by different flow rates. Thus, in accordance with the invention, the foregoing deficiencies are overcome by an improved arrangement of the resistance wires forming an electric heater and temperature dependent resistors in which the resistance wires are each stretched in a striped pattern and in such a direction that the lines of the electric heater cross those of the resistor when viewed from the front.

It is another object of the invention to provide a gas flow measuring apparatus which prevents damages to its temperature dependent resistors and heater and ensures an improved durability.

DESCRIPTION OF PREFERRED EMBODIMENTS

The invention will now be described in greater detail with reference to the illustrated embodiments.

Figure 1:
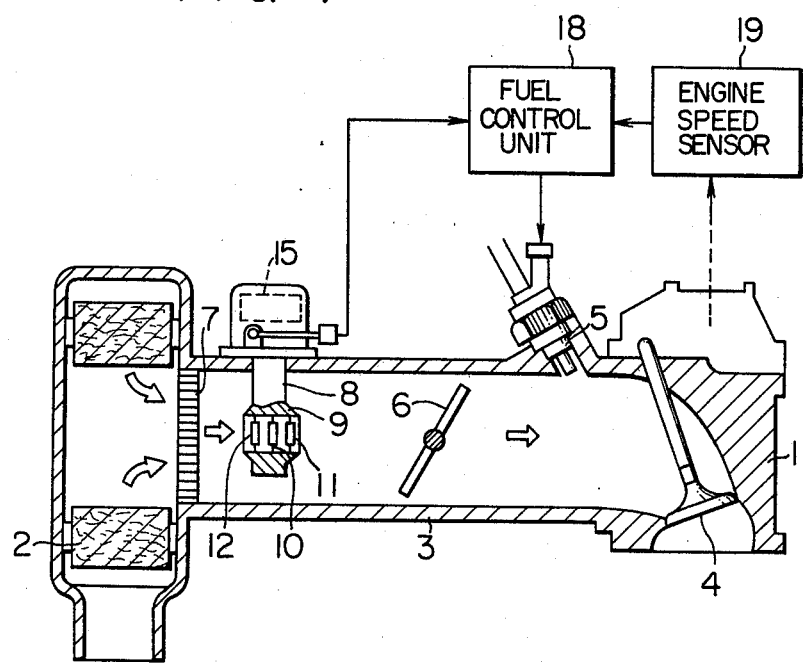
FIG. 1 is a schematic diagram showing the overall construction of an embodiment of a gas flow measuring apparatus according to the invention.

Referring to FIG. 1, an engine 1 is an automobile propelling engine of the spark ignition type, and the air for combustion is drawn through an air cleaner 2, an intake pipe 3 and an intake valve 4. The fuel is supplied by injecting the same through an electromagnetically operated fuel injection valve 5 mounted in the intake pipe 3.

Mounted in the intake pipe 3 is a throttle valve 6 which is operable as desired by the driver, and a flow-rectifying or straightening device 7 for rectifying the air flow is mounted in the intake pipe 3 at the joint with the air cleaner 2.

Also provided in the intake pipe 3 between the flow-rectifying device 7 and the throttle valve 6 is a small flow measuring pipe 9 which is mounted on a support 8 to extend substantially parallel to the axial direction of the intake pipe 3. An electric heater 10 consisting of a platinum resistance wire is mounted in the flow measuring pipe 9 as shown schematically in the Figure, and mounted in a position which is downstream and adjacent to the electric heater 10 is a first temperature dependent resistor 11 consisting of a platinum resistance wire. A second temperature dependent resistor 12 consisting of a platinum resistance wire is mounted in a position which is upstream and rather remote from the electric heater 10.

Figure 2:
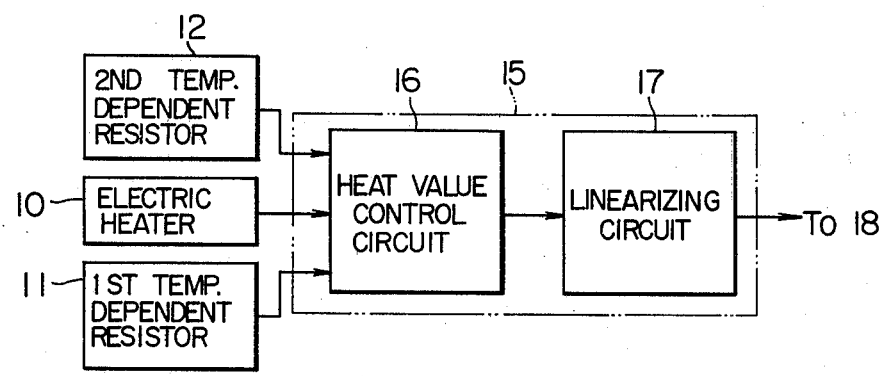
FIG. 2 is a block diagram for the measuring circuit shown in FIG. 1.

The electric heater 10 and the first and second temperature dependent resistors 11 and 12 are all connected to a measuring circuit 15 within a case so that the measuring circuit 15 measures the amount of air flow to the engine and an electric signal corresponding to the flow rate is generated. As shown in FIG. 2, the measuring circuit 15 comprises a heat value control circuit 16 and a linearizing circuit 17, whereby the heat value control circuit 16 is responsive to the output signal of a bridge comprising the first and second temperature dependent resistors 11 and 12 so as to control the voltage applied to the electric heater 10 and the bridge and the linearizing circuit 17 provides compensation so that the output signal of the heat value control circuit 16 has a linear relation with the amount of air flow.

Referring again to FIG. 1, a fuel control unit 18 is responsive to the output signal of the measuring circuit 15 to control the duration of opening of the electromagnetic fuel injection valve 5 and the control unit 18 also receives the detection signal from an engine speed sensor 19 which detects the rotational speed of the engine 1. The engine speed sensor 19 may be comprised for example of a known type of ignition detection circuit for generating an ignition pulse signal. While, in the present embodiment, the sensor 19 detects the engine rotational speed, it may be replaced with one which detects any other engine parameter.

Figure 3:
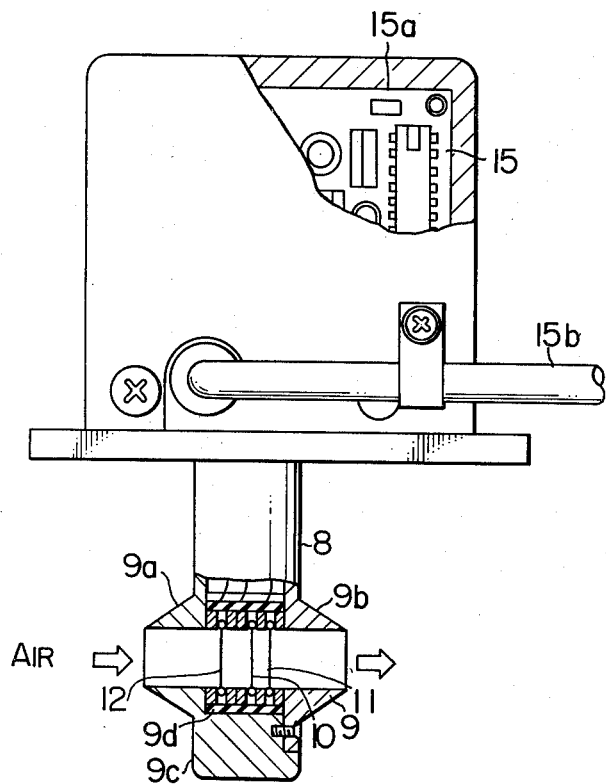
FIGS. 3 and 4 are respectively a partially sectional side view and a partially sectional front view of the flow measuring pipe shown in FIG. 1.
Figure 4:
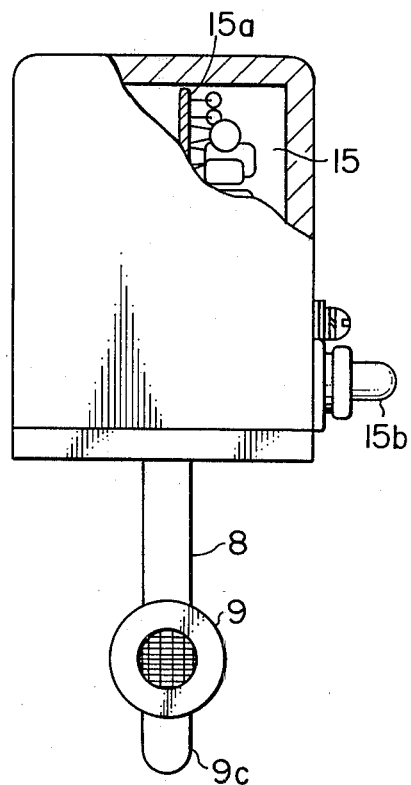

The construction of the measuring apparatus will now be described with reference to FIGS. 3 to 6. FIG. 3 is a partially sectional side view and FIG. 4 is a front view. The flow measuring pipe 9 and the support 8 are integrally molded out of aluminum by a lost wax technique and its ends 9a and 9b are tapered off so as to decrease the resistance to the air flow. Its lower part 9c is formed with a projection for the screws for holding the electric heater 10 and the first and second temperature dependent resistors 11 and 12 in place inside the flow measuring pipe 9.

The support 8 is formed in the central portion thereof with a single hollow passage through which are run the lead wires connecting the measuring circuit 15 to the electric heater 10 and the first and second temperature dependent resistors 11 and 12.

Figure 5:
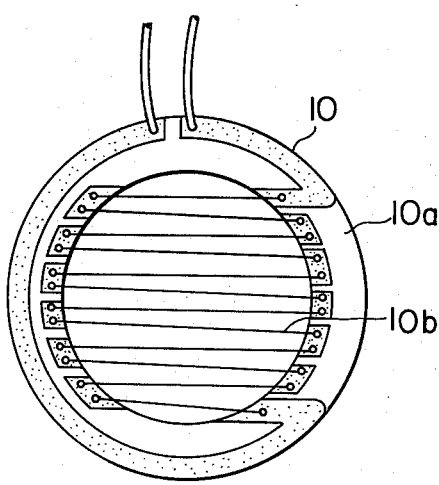
FIG. 5 is a front view showing an embodiment of the electric heater shown in FIG. 1.
Figure 6:
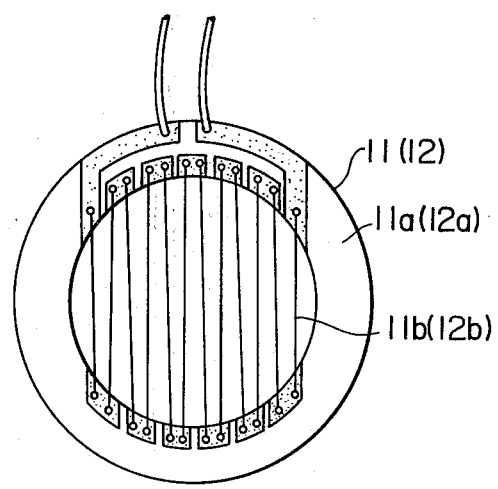
FIG. 6 is a front view showing an embodiment of the first and second temperature dependent resistors shown in FIG. 3.

As shown in FIG. 5 showing its embodiment the electric heater 10 comprises a platinum resistance wire 10b which is stretched substantially parallely in a lateral striped pattern across a ring-shaped printed circuit board 10a, and the first and second temperature dependent resistors 11 and 12 are each comprised of a platinum resistance wire 11b (or 12b) which is stretched parallely in a vertical striped pattern across a ring-shaped printed circuit board 11a (or 12a) as shown in FIG. 6. These elements are mounted inside the flow measuring pipe 9 while maintaining their positional relation.

Thus, the resistance wires of the electric heater 10 and the first and second temperature dependent resistors 11 and 12 are stretched in the directions so as to cross each other and they form a crosswise lattice pattern as shown in FIG. 4 when viewed from the front.

As shown in FIG. 3, the printed circuit boards 10a, 11a and 12a forming the bases of the electric heater 10 and the temperature dependent resistors 11 and 12 are mounted inside the flow measuring pipe 9 through a cushioning material 9d made of rubber material in such a manner that the electric heater 10 is positioned substantially centrally, while the first temperature dependent resistor 11 is arranged in a position which is downstream and adjacent to the heater 10 and the second temperature dependent resistor 12 in a position which is upstream and rather remote from the heater 10.

The individual circuit elements of the measuring circuit 15 are assembled on a printed circuit board 15a mounted inside a case and its output signal is transmitted to the fuel control unit 18 through a cable 15b.

Figure 7:
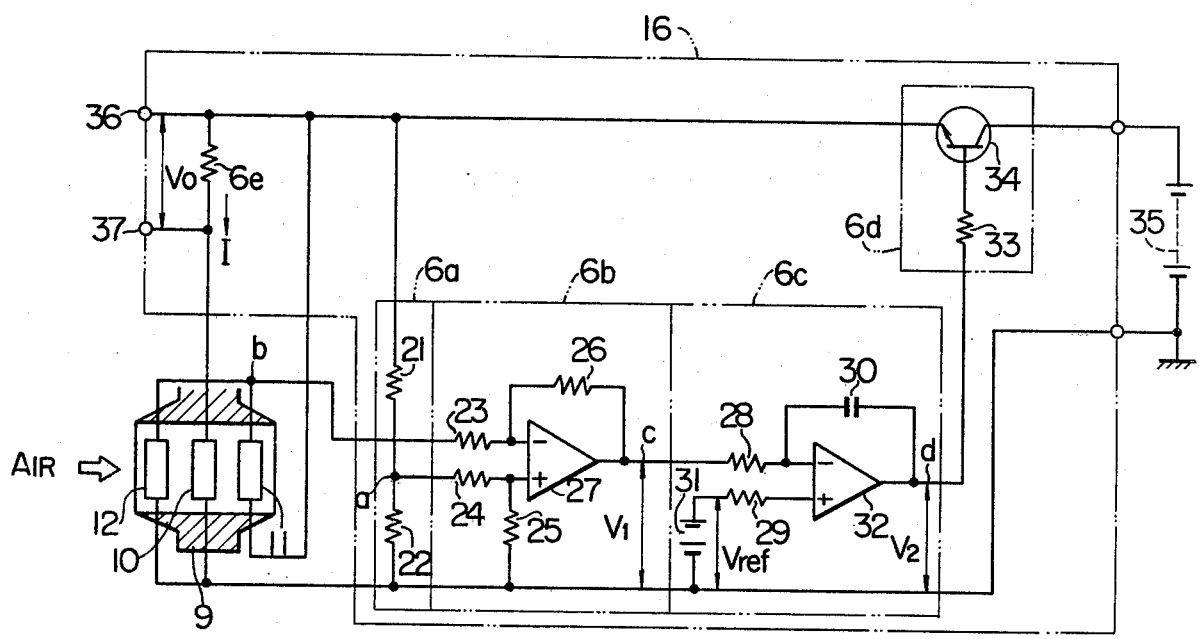
FIG. 7 is a circuit diagram of the heat value control circuit shown in FIG. 2.

Next, the heat value control circuit 16 will be described with reference to FIG. 7. Generally, the heat value control circuit 16 comprises a reference resistance unit 6a, a first differential amplifier 6b, a second differential amplifier 6c, a power amplifier 6d and an output resistor 6e.

The resistance unit 6a comprises resistors 21 and 22 and a bridge is formed by it along with the first and second temperature dependent resistors 11 and 12.

The first differential amplifier 6b comprises input resistors 23 and 24, a ground resistor 25, a negative feedback resistor 26 and an operational amplifier 27 (hereinafter referred to as an OP amplifier) and the voltages at bridge diagonal points a and b are differentially amplified to generate an output from a terminal c.

The second differential amplifier 6c comprises input resistors 28 and 29, a capacitor 30, a reference power source 31 and an OP amplifier 32, whereby the output voltage at the terminal c and the fixed reference voltage $V_{ref}$ from the reference power source 31 are differentially amplified to generate an output voltage from a terminal d. The capacitor 30 is provided to prevent oscillation of the apparatus.

The power amplifier 6d comprises a resistor 33 and a power transistor 34 which is supplied with the power from a battery 35, whereby the output voltage of the second amplifier 6c is subjected to power amplification and the resulting output is applied to the bridge and the electric heater 10.

The output resistor 6e is provided to apply to the linearizing circuit 17 a voltage related to the amount of air flow to the engine and the output resistor 6e is connected in series with the electric heater 10. The output resistor 6e has its terminals 36 and 37 connected to the linerizing circuit 17.

Figure 8:
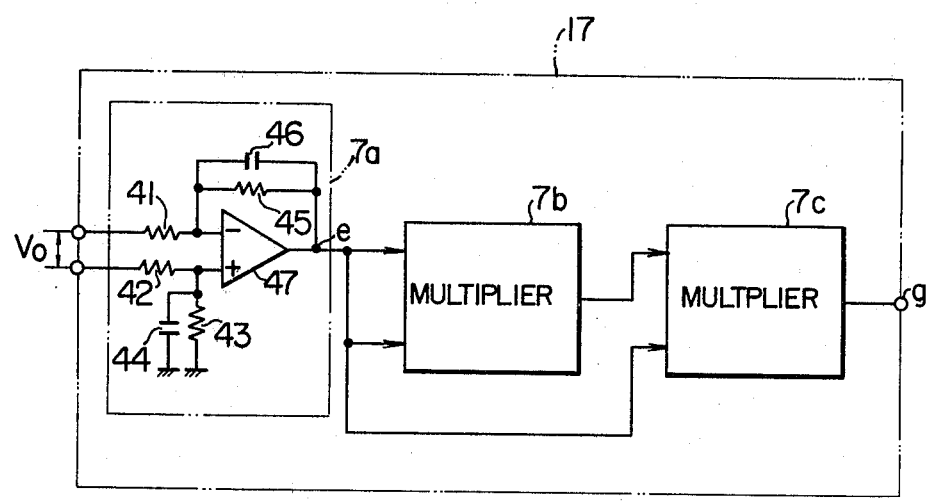
FIG. 8 is a circuit diagram of the linearizing circuit shown in FIG. 2.

The linearizing circuit 17 will now be described with reference to FIG. 8. The linearizing circuit 17 mainly comprises a differential amplifier 7a and multipliers 7b and 7c.

Of these component parts, the differential amplifier 7a comprises input resistors 41 and 42, a ground resistor 43, a ground capacitor 44, a negative feedback resistor 45, a capacitor 46 and an OP amplifier 47, whereby the output voltage of the heat value control circuit 16 is differentially amplified to generate an output from a terminal e.

The multipliers 7b and 7c are of the known analog type which multiplies its two input voltages to generate a voltage corresponding to the resulting product.

Next, the fuel control unit 18 will be described with reference to FIG. 9. Basically the fuel control unit 18 is designed so that the computation of air flow rate G/engine rotational speed N is performed digitally and an injection pulse signal corresponding to G/N is applied to the electromagnetic fuel injection valve 5.

A divider/counter 8a may for example be comprised of the RCA CD4017, whereby the output signal of an oscillator 8b is applied to its clock terminal CL, while its reset terminal R receives from the engine speed sensor 19 a pulse signal having a period inversely proportional to the engine rotational speed N and its clock enable terminal CE receives the "4" output of the counter 8a. The oscillator 8b comprises a known type of crystal oscillator incorporating a quartz crystal and it generates a pulse signal of a fixed frequency.

A two-input OR gate 8c performs the known OR logic operation and it receives the output signal of the engine speed sensor 19 and the "4" output signal of the counter 8a.

A V-F converter 8d comprises a known type of voltage-to-frequency converter for converting the analog output voltage of the linearizing circuit 17 to a pulse signal having a frequency proportional to the air flow rate G.

A two-input AND gate 8e performs the known AND logic operation and it receives the output signals of the V-F converter 8d and OR gate 8c.

A binary counter 8f counts the pulse signals applied to its clock terminal CL to generate the resulting count as a binary coded digital signal, and the counter 8f receives at its terminal CL the output signal of the AND gate 8e and has its reset terminal R connected to the "3" output of the counter 8a.

A latch circuit 8g is of the known type which stores temporarily the output signal of the binary counter 8f in response to the signal applied to its latch terminal L and the signal applied to the latch terminal L is the "2" output signal of the counter 8a.

A binary counter 8h is of the known type which counts the pulse signals applied to its clock terminal CL and here it serves as a frequency divider for dividing the output signals of the oscillator 8b.

An AND gate 8i receives and performs the AND operation on the output signal of the binary counter 8h and the output signal of a flip-flop 8p.

A binary counter 8m is of the same type as the counter 8f in which the "2" output signal of the counter 8a is applied to the reset terminal R, whereby after the counter has been reset by the signal, the output signals of the AND gate 8i applied to the clock terminal CL are counted and the resulting count is generated as a binary coded digital signal.

A comparator 8n compares the numerical values of the binary codes applied to its terminal groups A and B, whereby when the input values are equal to each other, a trigger signal is generated from its terminal C.

The flip-flop 8p comprises a pair of two-input NOR gates and it receives as its trigger signals the "2" output signal of the counter 8a and the output signal of the comparator 8n.

Although not shown in detail, a power circuit 8r includes a known type of power transistor and it controls the energization of the fuel injection valve 5 in response to the input signal.

With the construction described above, the operation of the embodiment is as follows. In FIG. 1 an amount of air determined by the position of the throttle valve 6 is drawn into the engine 1 from the air cleaner 2 through the intake pipe 3. Of the total amount of the air sucked, a fixed proportion of the air flow is sucked into the engine 1 through the flow measuring pipe 9.

In the flow measuring pipe 9, the second temperature dependent resistor 12 positioned upstream of the electric heater 10 is affected only by the temperature of the air flow and the first temperature dependent resistor 11 positioned downstream of the electric heater 10 is affected by the temperature of the air flow and the heat value of the electric heater 10 or the temperature of the air heated by the electric heater 10.

Consequently, there occurs between the temperature dependent resistors 11 and 12 a temperature difference $\Delta T$ which is related to the electric energy P(W) supplied to the electric heater 10 and the air flow rate G (g/sec). In this case, the relation between P, G and $\Delta T$ is given by the following equation.

$$K_1 \cdot \Delta T = P/G \tag{1}$$

where $K_1$ is a constant.

Since the electric resistance value of the temperature dependent resistors 11 and 12 varies with the temperature of the air, a potential difference $\Delta T$ is developed across the points a and b of the bridge and this potential difference $\Delta V$ is determined by the temperature difference $\Delta T$ and the voltage V applied to the bridge as shown by the following equation (2)

$$\Delta V = K_2 \cdot \Delta T \cdot V \tag{2}$$

where $K_2$ is a constant.

Thus, the following relationship is obtained from the equations (1) and (2).

$$K_3 \cdot \Delta V/V = P/G \tag{3}$$

where $K_3$ is a constant.

As a result, if the power supply P to the electric heater 10 and the bridge applied voltage V are controlled to maintain the potential difference $\Delta V$ at a constant value, the relation between the air flow rate G, the power supply P and the bridge applied voltage V is given by the following equation $$G = K_4 \cdot P \cdot V \tag{4}$$

where $K_4$ is a constant.

In this case, if the resistance value of the output resistor 6e is selected smaller than that of the electric heater 10 and the current flowing in the electric heater 10 is represented by I, then the following equations (5) and (6) hold $$P \approx K_5 \cdot I^2 \tag{5}$$

$$V \approx K_6 \cdot I \tag{6}$$

where $K_5$ and $K_6$ are constants. From these equations the equation (4) is given as follows $$G \approx K \cdot I^3 \tag{7}$$
$$\approx K' \cdot V^3 \tag{8}$$

where K and K' are constants. The air flow rate G is a function of the third power of the current I (or the voltage V). Although the equations (7) and (8) are the approximations, these approximations are such that there will be no effect on the measurement and there will be no problem from the practical point of view.

As a result, the heat value control circuit 16 controls the heat value of the electric heater 10 so as to control the potential difference $\Delta V$ at a constant value. More specifically, an increase in the amount of air flow results in a decrease in the temperature rise of the air heated by the electric heater 10 so that the temperature difference $\Delta T$ between the first and second temperature-dependent resistors 11 and 12 is decreased and the potential difference $\Delta V$ across the bridge points a and b is also decreased.

Consequently, the output voltage $V_1$ of the first differential amplifier 6b is decreased and this increases the output voltage $V_2$ of the second differential amplifier 6c which generates a voltage corresponding to $V_{ref} - V_1$. As a result, the power amplifier 6d increases the current supply to the electric heater 10 and the heat value of the electric heater 10 is increased.

As a result, the temperature difference ΔT between the first and second temperature dependent resistors 11 and 12 is increased and thus the potential difference ΔT between the bridge points a and b is increased. Consequently, when the voltage $V_1$ corresponding to the potential difference ΔV eventually becomes equal to the reference voltage $V_{ref}$, a stable condition is established in which the system on the whole is balanced while the bridge is kept unbalanced.

When the air flow rate is decreased, the temperature rise of the air heated by the electric heater 10 is increased so that the temperature difference ΔT between the first and second temperature dependent resistors 11 and 12 is increased and the potential difference ΔV is also increased.

When this occurs, the output voltage $V_1$ of the first differential amplifier 6b is increased and the output voltage $V_2$ of the second differential amplifier 6c is decreased. Consequently, the power circuit 6d decreases the current supplied to the electric heater 10 and the heat value of the electric heater 10 is decreased.

As a result, the temperature difference ΔT is decreased and the potential difference ΔV corresponding to the voltage $V_1$ becomes equal to the reference voltage $V_{ref}$, bringing both the system and the bridge into a stable condition.

In this way, the potential difference ΔV between the bridge points a and b is always maintained at the fixed value $V_{ref}$ irrespective of the amount of air flow to the engine and the equation (7) is established, giving the air flow rate G as a function of the third power of the current I flowing in the electric heater 10.

Since the current I also flows through the output resistor 6e, the current I is proportional to the terminal voltage $V_0$ of the output resistor 6e and the third power of the voltage $V_0$ is proportional to the air flow rate G.

As a result, the output voltage $V_0$ of the heat value control circuit 16 is raised to the third power by the linearizing circuit 17. More specifically, the voltage across the output resistor 6e of the heat value control circuit 16 shown in FIG. 7 is amplified by the differential amplifier 7a shown in FIG. 8, generating from the terminal e a voltage corresponding to $A_1 \cdot V_0$. Here $A_1$ is the amplification factor of the amplifier 7a.

The output voltage $A_1 \cdot V_0$ is applied to the two input terminal of the multiplier 7b which in turn generates a voltage corresponding to $A_1^2 \cdot V_0^2$. The voltage $A_1 \cdot V_0$ and the voltage $A_1^2 \cdot V_0^2$ are applied to the multiplier 7c which in turn generates a voltage corresponding to $A_1^3 \cdot V_0^3$.

In this way, the linearizing circuit 17 generates from its output terminal g a voltage $V_g$ which is proportional to the third power of the voltage $V_0$ or the amount of air flow to the engine.

The voltage $V_g$ is then applied to the fuel control unit 18 as a signal indicative of the air flow rate G and in response to this signal and the output signal of the engine speed sensor 19 the fuel control unit 18 generates an injection pulse signal for opening the fuel injection valve 5.

Figure 9:
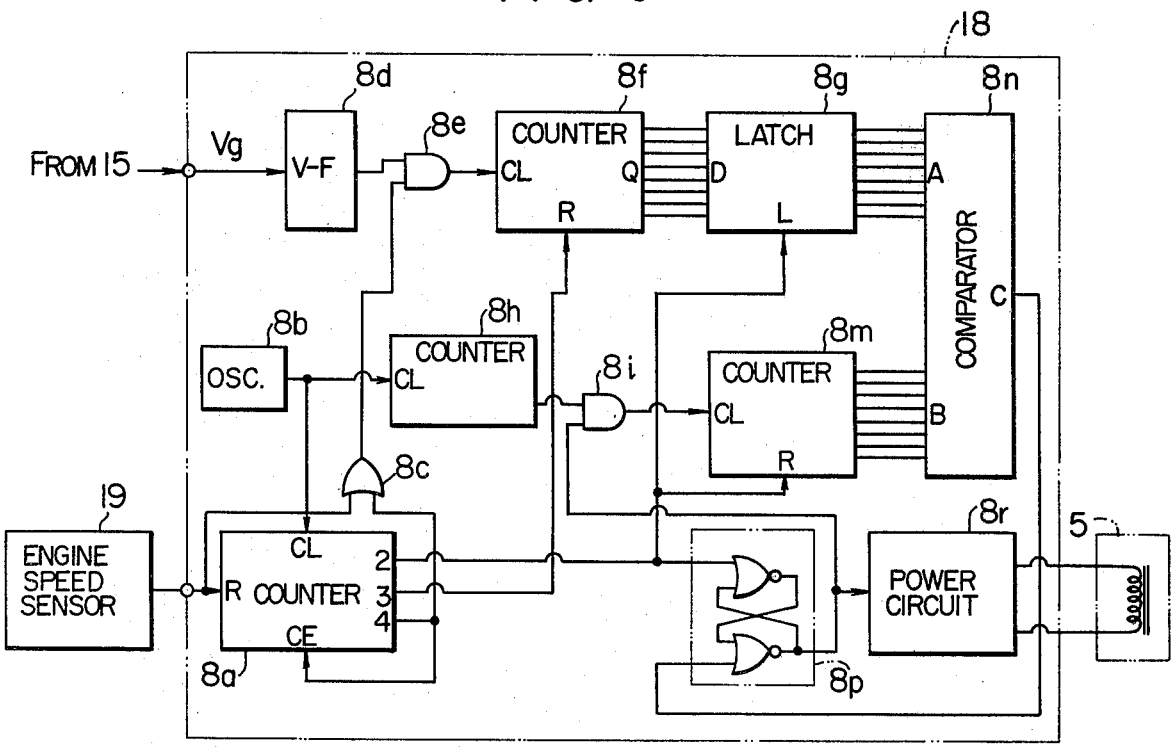
FIG. 9 is a circuit diagram of the fuel control unit shown in FIG. 1.
Figure 10:
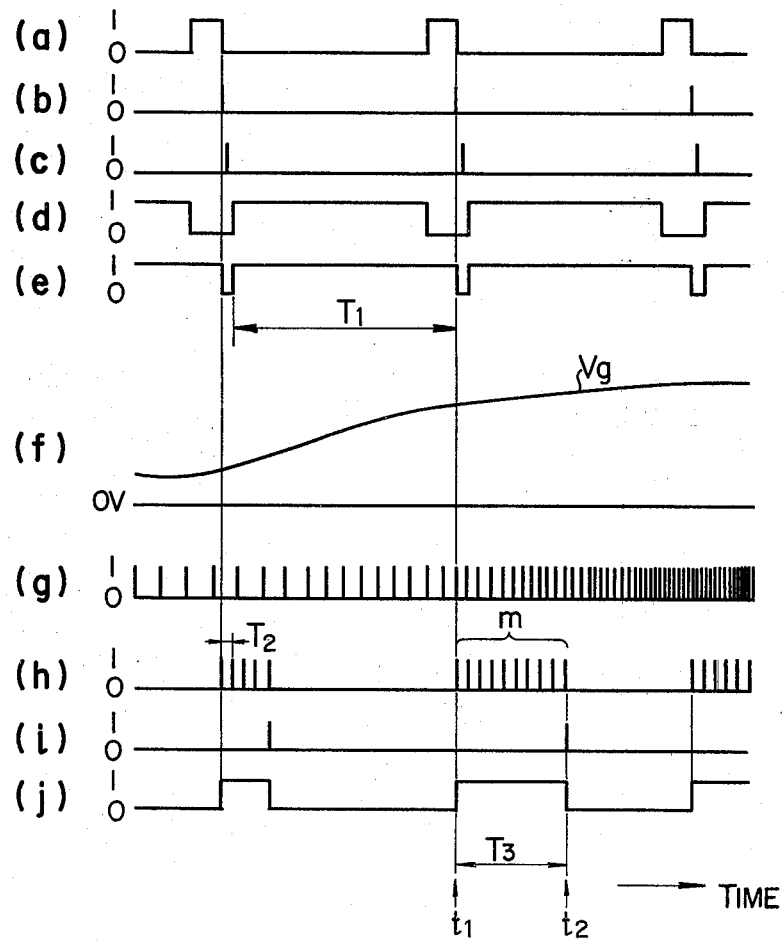
FIG. 10 is a waveform diagram useful in explaining the operation of the embodiment of FIG. 1.

More specifically, in the fuel control unit 18 shown in FIG. 9, the divider/counter 8a is reset by the pulse signal from the engine speed sensor 19 shown in (a) of FIG. 10 so that in synchronism with the clock pulse signals from the oscillator 8b immediately after the fall time of the pulse signal shown in (a) of FIG. 10, the pulse signal shown in (b) of FIG. 10 is generated from its "2" output terminal and the pulse signal shown in (c) of FIG. 10 is generated from its "3" output terminal. The counter 8a is also designed so that the output signal from its "4" output terminal is fed back to its clock enable terminal CE and consequently the count of the counter 8a is not advance until it is reset again, thus producing an output waveform as shown in (d) of FIG. 10.

On the other hand, the output signal of the OR gate 8c has the waveform shown in (e) of FIG. 10, and if the period of the output signal of the oscillator 8b is sufficiently short as compared with that of the output signal of the engine speed sensor 19, the time width $T_7$ between the rising and falling edges of the said pulse signal will be inversely proportional to the engine rotational speed N.

The output voltage $V_g$ of the linearizing circuit 17 which is shown in (f) of FIG. 10 and proportional to the air flow rate G, is subjected to voltage-to-frequency conversion in the V-F converter 8d and the voltage $V_g$ is converted to a pulse signal of a frequency as shown in (g) of FIG. 10. The pulse signals are applied to the AND gate 8e and the pulses are then applied to and counted by the binary counter 8f during the time interval $T_1$ shown in (e) of FIG. 10.

The count of the binary counter 8f assumes a value which is proportional to the air flow rate G and inversely proportional to the engine rotational speed N or a value corresponding to G/N and this binary coded value is temporarily stored in synchronism with the signal shown in (b) of FIG. 10.

On the other hand, the clock signals from the oscillator 8b are divided by the binary counter 8h and the resulting pulse signals of a suitable frequency are applied to the AND gate 8i. The AND gate 8i is opened at a time $t_1$ at which the flip-flop 8p is set by the "2" output signal shown in (b) of FIG. 10 and thereafter the pulse signals shown in (h) of FIG. 10 are applied to the binary counter 8m which in turn starts counting the pulse signals.

The binary coded output signal of the latch circuit 8g has been applied to the comparator 8n, so that when the count of the binary counter 8m increases and eventually becomes equal to the output value of the latch circuit 8g, the comparator 8n generates the coincidence signal shown in (i) of FIG. 10 and the signal resets the flip-flop 8p. As a result, the flip-flop 8p generates an injection pulse signal having the waveform shown in (j) of FIG. 10.

At the instant that the flip-flop 8p is reset the AND gate 8i is closed and the binary counter 8m stops the counting operation. In other words, the counting operation is stopped at a time $t_2$ in FIG. 10. If the then current count value of the binary counter 8m is represented as m and $T_2$ represents the period of the pulse signals shown in (h) of FIG. 10, then the time width $T_3$ of the output pulse signal of the flip-flop 8p is given by the following equation $$T_3 = m \cdot T_2$$

The time width $T_3$ corresponds to G/N. In other words, the time width $T_3$ is proportional to the amount of air flow per engine revolution.

Thus, if the injection pulse signal is subjected to power amplification by the power circuit 8r and the fuel is supplied to the engine 1 by way of the fuel injection valve 5, one-to-one correspondence will be provided between the fuel quantity and the amount of air flow and the air-fuel ratio will be controlled accurately with the resulting improvement on the exhaust emission control, power output and fuel consumption of the engine 1.

Figure 11:
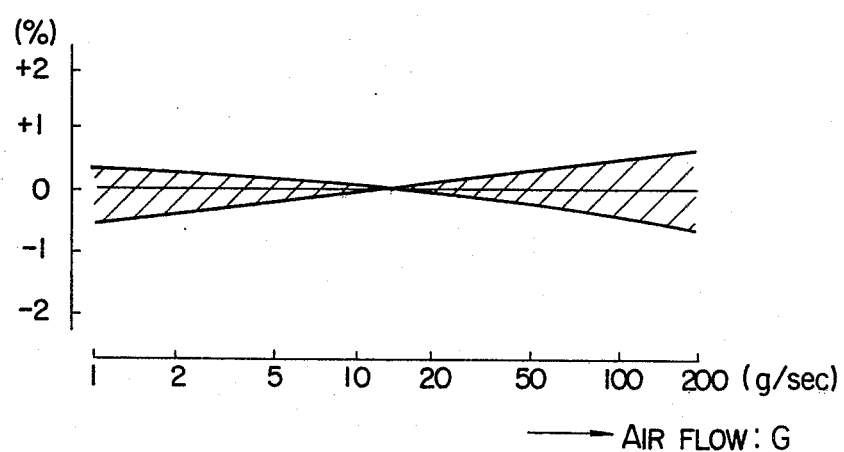
FIG. 11 is a graph useful in explaining the operation of the apparatus according to the invention.

As regards the measurement of air flow rate, if no consideration is given to the manner in which the resistance wires of the electric heater 10 and the first temperature dependent resistor 11 are stretched, the accuracy of measurement will be varied within ±2% at the maximum. In accordance with the invention, the resistance wires are stretched in such directions that the lines of the resistance wires cross each other when viewed from the front and this arrangement eliminates the effect of a very small variation in the heat distribution within the flow measuring pipe 9. In this way, the variations in measuring accuracy will be reduced to practically within ±0.5% as shown in FIG. 11 and the variations are so small that there is no problem from the standpoint of practical use.

Figure 12:
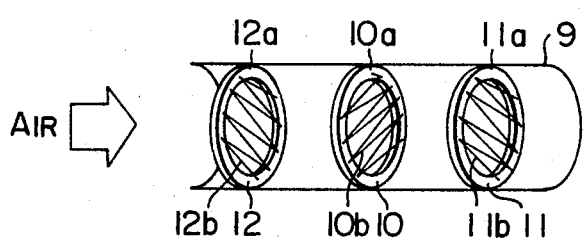
FIGS. 12 and 13 are a perspective view and a front view showing the principal parts of another embodiment of the electric heater and the temperature dependent resistors used with the invention.
Figure 13:
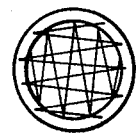

While, in the embodiment described above, the resistance wire of each of the electric heater 10 and the first and second temperature dependent resistors 11 and 12 is stretched so that the lines of the resistance wire are arranged substantially parallel to each other, the resistance wires may be stretched obliquely as shown in FIG. 12 so that the lines of the resistance wires cross each other as shown in FIG. 13 when viewed from the front. Further, while, in the above-described embodiment, the resistance wires of the electric heater 10 and the first temperature dependent resistor 11 are stretched so that their lines cross each other at right angles and this arrangement is ideal one from the standpoint of heat distribution, it has been confirmed that the heat distribution will be made substantially uniform if the lines are arranged to cross at an angle in the range of 20 to 160 degrees.

Figure 14:
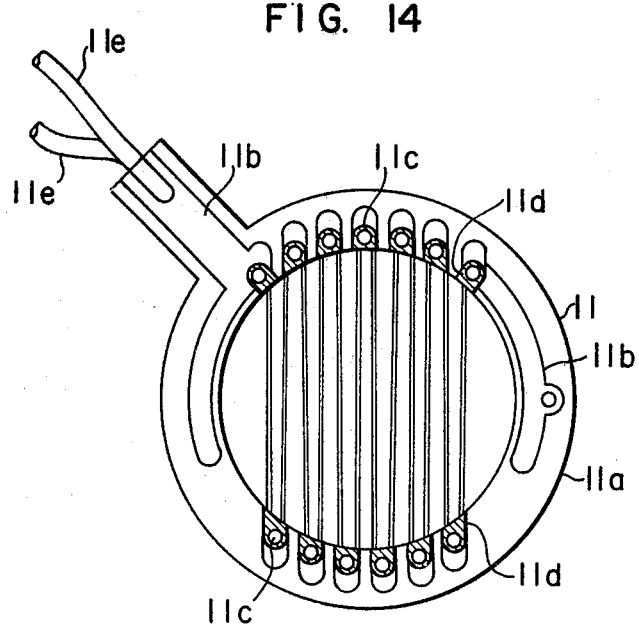
FIGS. 14 and 15 are respectively a front view and a sectional view showing still another embodiment of the temperature dependent resistors used with the invention.
Figure 15:
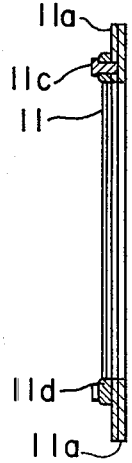
Figure 16:
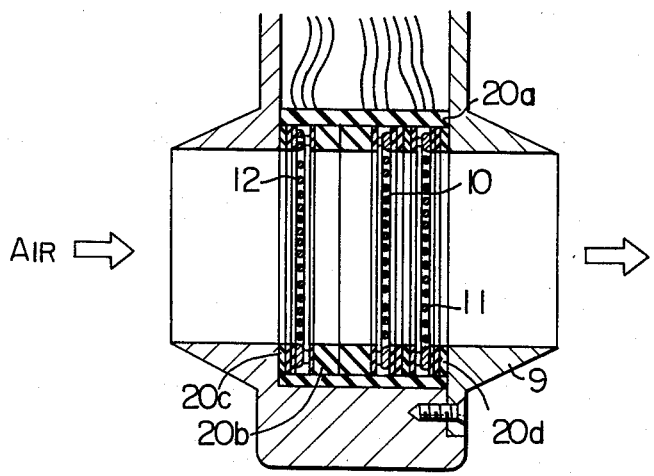
FIG. 16 is an enlarged sectional view showing the principal parts of another embodiment of the flow measuring pipe used with the invention.

In FIGS. 14 and 15 showing another embodiment of the platinum resistance wire 11, numeral 11a designates a ring-shaped base made of an electrical insulator such as ceramic, glass, epoxy or synthetic resin and it is made of two sheets of such material which are glued together with an adhesive to obtain the desired strength.

Attached to the surface of the base 11a are electrodes 11b which are made of nickel, gold, silver or copper and a total of 13 supporting members 11c which are made of electrically good conductor, such as Kovar, nickel or copper, T-shaped in cross-section and firmly fastened by soldering to the base portions including the electrodes 11b.

The resistance wire 11 is made fast to the supporting members 11c and stretched in a striped pattern in such a manner that the resistance wire portions which are placed on the base 11a and are not practically exposed to the flow of air, are coated with a conductive bonding agent 11d such as solder or silver powder paste and fastened to the supporting members 11c.

The heater resistance wire 10 and the resistance wire 12 are stretched in the same manner as the resistance wire 11, and the resistance wires 10, 11 and 12 fastened to their bases and held in place between cushion members 20a to 20d, are mounted within the flow measuring pipe 9.

The resistance wires 10, 11 and 12 are each comprised of a platinum wire whose resistance value varies in dependence on temperature and the resistance wires 11 and 12 have the same resistance-temperature characteristic.

Figure 17A:
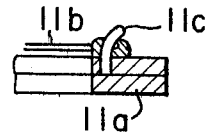
FIGS. 17A, 17B and 17C are sectional views showing the principal parts of still another embodiment of the electric heater and the temperature dependent resistors used with the invention.
Figure 17B:
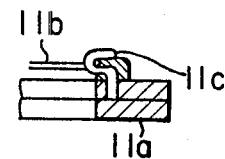
Figure 17C:
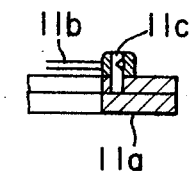

While, in the above-described embodiment, the supporting members provided on the base are formed into T-shape, the supporting members may be formed as shown in FIG. 17A so as to be bent in a direction opposite to that in which the resistance wire is stretched. The supporting members may each be shaped like a hook as shown in FIG. 17B or may each be comprised of a pin formed with a groove for holding the resistance wire as shown in FIG. 17C.

Figure 18:
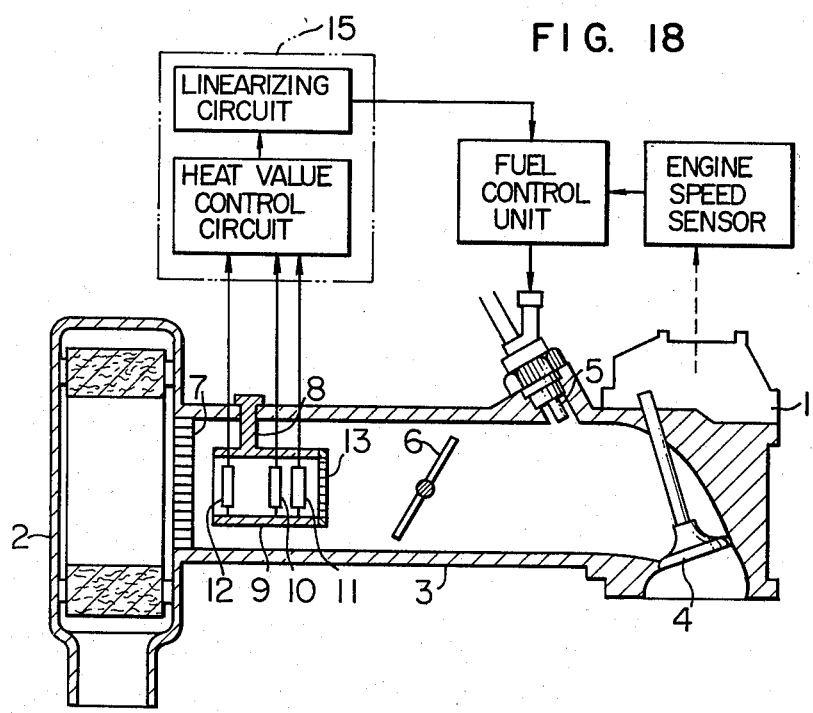
FIG. 18 is a schematic block diagram showing the overall construction of a modification of the gas flow measuring apparatus shown in FIG. 1.
Figure 19A:
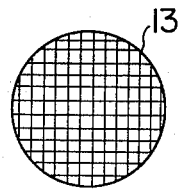
FIGS. 19A, 19B and 19C are front views showing embodiments of the flame arrester shown in FIG. 18.
Figure 19B:
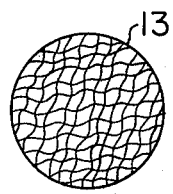
Figure 19C:
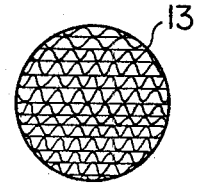

FIG. 18 shows a modification of the gas flow measuring apparatus shown in FIG. 1. The embodiment shown in FIG. 18 is identical with the embodiment of FIG. 1 except that a flame arrester 13 comprising a gauze or ceramic structure and adapted to pass air therethrough, is provided at the rear end of the flow measuring pipe 9. The frame arrester 13 has a lattice-like section as shown in FIG. 19A or a net-like section as shown in FIG. 19B or 19C and it is formed to a shape which has not much resistance to the flow of air therethrough.

The operation of the gas flow measuring apparatus shown in FIG. 18 is the same with the embodiment shown in FIG. 1 and will not be described in detail but the operation of the flame arrester 13 will be described. Assume that with the engine 1 in operation, a backfire is produced for some reason or other and the flame proceeds back into the intake pipe 3. In this case, the reverse flame is extinguished by the flame arrester 13 so that the reverse flame is prevented from reaching the electric heater 10 and the first and second temperature dependent resistors 11 and 12 and the backfire is prevented from causing damages to these elements or fouling them with carbon deposits.

Further, since the flame arrester 13 is mounted to the rear part of the flow measuring pipe 9, the resulting construction is simple and particularly there is no need to modify the flow measuring pipe 9 itself. In addition, the fact that the diameter of the flow measuring pipe 9 itself can be made smaller than the intake pipe 3 has the effect of minimizing the increase in the pressure loss (the resistance to air flow) due to the provision of the flame arrester 13.

While, in the above-described embodiment, the flame arrester 13 is mounted only to the rear part of the flow measuring pipe 9, another such device may also be mounted to the front part of the pipe 9 as occasion demands.

While, in the embodiments shown in FIGS. 1 and 18, the apparatus of this invention is used by way of example with the fuel injection type engine, the apparatus can also be used with carburetor type engines for the purpose of controlling the amount of exhaust gas recirculation or the amount of advance for the ignition timing in accordance with the amount of air flow to the engine.

In addition to these engines, the apparatus of this invention can be used for the purpose of measuring the rate of gas flow in other combustion apparatus.

While the invention has been described as applied to the apparatus including the electric heater 10 and the first and second temperature dependent resistors 11 and 12 for flow rate detecting purposes, the invention can also be embodied in a so-called hot-wire anemometer in which the flow rate is measured by means of a single temperature dependent resistor.

Still further, while the measuring circuit 15 includes the linearizing circuit 17, the circuit 17 may be replaced with any other means such as an ROM for digital signal processing purposes, and it is also possible to eliminate the circuit 17 if no linearized output is required.

We claim:

1. A gas flow measuring apparatus comprising:
a flow measuring pipe disposed within a pipe through which a gas to be measured flows said flow measuring pipe having a smaller diameter than that of said pipe through which the gas flows;
an electric heater disposed in said flow measuring pipe;
a first temperature dependent resistor disposed downstream of said electric heater in said flow measuring pipe;
a second temperature dependent resistor positioned in said flow measuring pipe so as not to be affected thermally by said electric heater; and
a measuring circuit connected to said electric heater and said first and second temperature dependent resistors so as to be responsive to said first and second temperature dependent resistors to control said electric heater and thereby to measure the flow rate of said gas to be measured,
each of said electric heater and said first and second temperature dependent resistors including a plurality of resistance wire lines, a frame member and a plurality of supporting members attached to said frame member so as to fasten said resistance wire lines to said frame member in such a manner that lines of said resistance wire are arranged in rows;
the lines of said electric heater being arranged so as not to be parallel with the lines of said first temperature dependent resistor and the portions of the wire lines of said heater and first and second temperature dependent resistors that run along the frame member so as not to be exposed to the flow of gas being coated with a conductive bonding agent so as to provide an electrical short circuit among such portions thereby effectively eliminating the electrical resistance of such portions.

2. An apparatus according to claim 1, wherein at least one of said supporting members has substantially a T-shaped section.

3. An apparatus according to claim 1, wherein at least one of said supporting members has a cross-sectional shape hooked in a direction to apply tension to said resistance wire.

4. An apparatus according to claim 1, wherein at least one of said supporting members is formed with a groove at a position thereof facing a circumference portion of said respective frame member to support said respective resistance wire.

5. An apparatus according to claim 1, 2, 3 or 4, further comprising flame arresting means disposed downstream of said first temperature dependent resistor in said flow measuring pipe.

6. A gas flow measuring apparatus comprising:
a flow measuring pipe disposed within a pipe through which a gas to be measured flows, said flow measuring pipe having a smaller diameter than that of said pipe through which the gas to be measured flows;
an electric heater disposed in said flow measuring pipe;
a first temperature dependent resistor disposed downstream of said electric heater in said flow measuring pipe;
a second temperature dependent resistor positioned in said flow measuring pipe so as not to be affected thermally by said electric heater;
each of said electric heater and said first and second temperature dependent resistors including a plurality of resistance wire lines, a frame member and a plurality of supporting members attached to said frame member so as to fasten said resistance wire lines to said frame member in such a manner that said lines are arranged in rows, portions of said lines which are placed on the frame member so as not to be exposed to the flow of the gas being coated with a conductive bonding agent to effectively electrically short circuit the resistance of said portions, the lines of said electric heater being arranged so as not to be parallel with the lines of said first temperature dependent resistor; and
a measuring circuit connected to said electric heater and said first and second temperature dependent resistors so as to be responsive to said first and second temperature dependent resistors to control said electric heater and thereby to measure the flow rate of said gas to be measured, said measuring circuit including a first reference resistor and a second reference resistor which, in combination with said first and second temperature dependent resistors, form a bridge circuit; a first differential amplifier circuit connected to said bridge circuit for amplifying a potential difference between diagonal points of said bridge circuit; a second differential amplifier circuit connected to said first differential amplifier circuit for amplifying the difference between the amplified output voltage of said first differential amplifier circuit and a predetermined reference voltage; a power amplifier connected to said second differential amplifier circuit for power amplifying the amplified output voltage of said second differtial amplifier circuit; and an output resistor connected to said power amplifier and to said electric heater to provide thereacross an output voltage the third power of which is proportional to the flow rate of the gas to be measured.

7. A gas flow measuring apparatus, comprising:
a flow measuring pipe disposed within a pipe through which a gas to be measured flows, said flow measuring pipe (a) having a smaller diameter than that of said pipe through which the gas flow, (b) having tapered ends and (c) being made integrally with a hollow support member having a single hollow passage, said hollow support member being attached to a base member;
an electric heater disposed in said flow measuring pipe;
a first temperature dependent resistor disposed downstream of said electric heater in said flow measuring pipe;
a second temperature dependent resistor positioned in said flow measuring pipe so as not to be affected thermally by said electric heater;
each of said electric heater and said first and second temperature dependent resistors including a plurality of resistance wire lines, a frame member and a plurality of supporting members attached to said frame member so as to fasten said resistance wire lines to said frame member in such a manner that said lines are arranged in rows, portions of said lines which are placed on the frame member so as not to be exposed to the flow of the gas being coated with a conductive bonding agent to effectively electrically short circuit the resistance of said portions, said frame member being mounted inside the flow measuring pipe through a cushioning material, and the lines of said electric heater being arranged so at not to be parallel with the lines of said first temperature dependent resistor; and a measuring circuit mounted on the base member and electrically connected to said electric heater and said first and second temperature dependent resistors by means of lead wires passing through the single hollow passage of said hollow support member so as to be responsive to said first and second temperature dependent resistors to control said electric heater and thereby to measure the flow rate of said gas to be measured 8. A gas flow measuring apparatus comprising:
a flow measuring pipe disposed within a pipe through which a gas to be measured flows, said flow measuring pipe (a) having a smaller diameter than that of said pipe through which the gas flows, (b) having tapered ends and (c) being made integrally with a hollow support member havaing a single hollow passage, said hollow support member being attached to a base member;
an electric heater disposed in said flow measuring pipe;
a first temperature dependent resistor disposed downstream of said electric heater within said flow measuring pipe;
a second temperature dependent resistor positioned within said flow measuring pipe so as not to be affected thermally by said electric heater;
each of said electric heater and said first and second temperature dependent resistors including at least one resistance wire, a frame member and a plurality of supporting members attached to said frame member so as to fasten said resistance wire to said frame member in such a manner that lines of said resistance wire are arranged in rows, portions of said resistance wire which are placed on the frame member so as not to be exposed to the flow of the gas being coated with a conductive bonding agent to effectively electrically short circuit the resistance of said portions, said frame member being mounted inside the flow measuring pipe through a cushioning material, and the lines of said electric heater being arranged to not be parallel with the lines of said first temperature dependent resistor; and a measuring circuit mounted on the base member and electrically connected to said electric heater and said first and second temperature dependent resistors by means of lead wires passing through the single hollow passage of said hollow support member so as to be responsive to said first and second temperature dependent resistors to control said electric heater and thereby to measure the flow rate of said gas to be measured, said measuring circuit including a first reference resistor and a second reference resistor which, in combination with said first and second temperature dependent resistors, form a bridge circuit; a first differential amplifier circuit connected to said bridge circuit for amplifying a potential difference between diagonal points of said bridge circuit; a second differential amplifier circuit connected to said first differential amplifier circuit for amplifying the difference between the amplified output voltage of said first differential amplifier circuit and a predetermined reference voltage; a power amplifier connected to said second differential amplifier circuit for power amplifying the amplified output voltage of said second differtial amplifier circuit; and an output resistor connected to said power amplifier and to said electric heater to provide thereacross an output voltage the third power of which is proportional to the flow rate of the gas to be measured.

* * * * *